T. B. ATTERBURY.
MANUFACTURE OF GLASSWARE.

No. 170,218. Patented Nov. 23, 1875.

Witnesses.
Jno. S. Slater
S. M. Pool

Inventor
Thomas B. Atterbury
by
Mason Fenwick & Lawrence

UNITED STATES PATENT OFFICE.

THOMAS B. ATTERBURY, OF PITTSBURG, PENNSYLVANIA, ASSIGNOR OF ONE-HALF HIS RIGHT TO JAMES S. ATTERBURY, OF SAME PLACE.

IMPROVEMENT IN THE MANUFACTURE OF GLASSWARE.

Specification forming part of Letters Patent No. 170,218, dated November 23, 1875; application filed November 8, 1875.

*To all whom it may concern:*

Be it known that I, THOMAS B. ATTERBURY, of Pittsburg, in the county of Allegheny and State of Pennsylvania, have invented a new and useful Improvement in Glassware, and other ware made of vitreous material; and I do hereby declare that the following is a full, clear, and exact description of the same, reference being had to the accompanying drawings forming part of this specification, in which—

Figure 1:
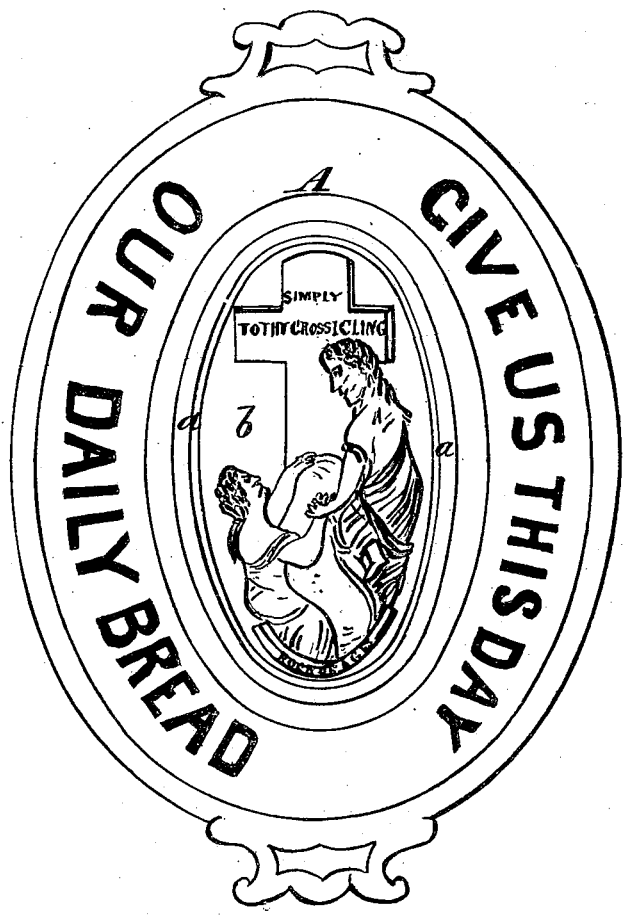
Figure 2:
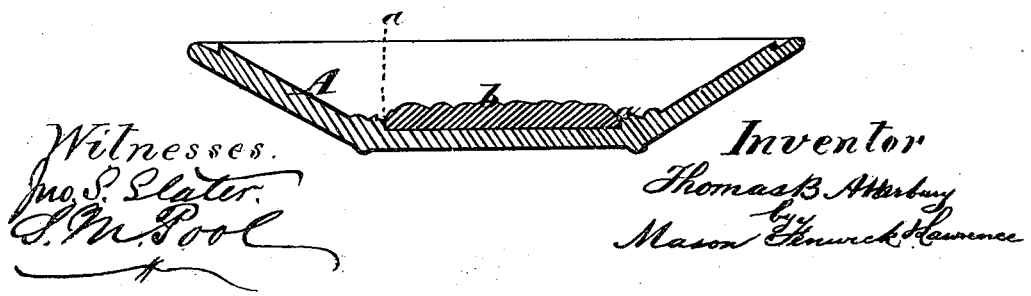

Figure 1 is a face or top view of a glass dish with my invention applied to it. Fig. 2 is a vertical transverse section of the same.

The nature of my invention consists in glassware, or ware made of vitreous material, either transparent, semi-transparent, or opaque, having a vitreous medallion or medallions set into it, such medallion or medallions being of any appropriate configuration, and of a different-colored glass from the glassware in which they are set.

In the accompanying drawings I have represented a well-known form of bread-dish as one instance among many of the applications which may be made of my invention; and in the following description I will give two practical modes of making glassware with a medallion or medallions set into it.

To produce the dish A, press the glass therefor in a mold in the ordinary way, except that the mold which shapes the inside of the dish should be constructed to form a recess or depression, $a$, in that portion of the glass which forms the bottom of the dish, as shown in Fig. 2. Next, press a medallion, $b$, of the same size as the recess, and of a thickness equal to the depth of the recess, or as much greater than the depth of the recess as may be desired.

The dish here represented is made of transparent vitreous material, and the medallion of opal or white vitreous material, and the two parts may be so closely matched, for the purpose of being fitted together, that, when the medallion is set in the recess, it will remain united to the dish by frictional contact, and not be liable to fall out of the recess under ordinary or careful handling. But cement—such as plaster-of-paris, or other suitable material—may be used for uniting the medallion and dish, and for more securely holding the medallion in place.

The article thus made is ready for the trade, or may be further finished by dressing off, as the nature of the case may require. The glass manufacture thus produced possesses great beauty, and has the appearance of being set with the most costly material, while, in fact, it costs but little more than the ordinary glassware not constructed with recesses and set with medallions.

A great variety of articles, so far as colors or contrasts of colors are concerned, can be made from the same molds—for instance, the dish may be of opal glass, and the medallion black or "jet," or the dish may be black or jet, with an opal medallion in it, or the various colors in which glassware are manufactured may be united with the most beautiful effect, without changing the character of my invention. Instead of making the glassware so that the medallion requires to be held in place by frictional contact or by cement, the dish may be formed with the recess $a$ in it, and a temporary sustaining ring-plate is placed in the recess while the glass of the dish is hot. The mold, with the glass dish in it, is next brought under another press, having a plunger with the medallion cut in it, and the ring-plate is removed, and the hot glass which is to form the medallion is placed in the recess $a$, and the medallion is formed, and the two kinds of glass united closely and firmly together by the same pressure.

This invention can be applied in the manufacture of goblets, bowls, door-knobs, buttons, breastpins, and other articles. The appearance will be very similar to, and look quite as well as, a cameo, if the base for a button or breastpin be black or jet, and the medallion of opal, or any other appropriate glass of a different color, and set in a recess, $a$, made in the base to receive it.

In the manufacture of door-knobs, if the knob proper is made black, with an opal medallion set in it, a very handsome article at a very small cost will be produced. In case it is desired to have several separate medallions set in the same article, several recesses, $a$, of proper size will be made on different parts of the article, and a medallion set in each recess.

What I claim is—

1. The new manufacture of glassware, or other ware made of vitreous material, with a medallion or medallions set into it, substantially as and for the purpose set forth.

2. A medallion set in glass, made and united to the article in which it is set by the one operation of pressing, substantially as described.

THOS. B. ATTERBURY.

Witnesses:
D. WENKE,
DANIEL WENKE, Jr.